United States Patent [19]

Soref

[11] Patent Number: 4,904,039

[45] Date of Patent: Feb. 27, 1990

[54] ELECTRO-OPTIC DEVICES UTILIZING A SAPPHIRE SUBSTRATE

[75] Inventor: Richard A. Soref, Newton Centre, Mass.

[73] Assignee: The United States of America as represented by the Secretary of the Air Force, Washington, D.C.

[21] Appl. No.: 273,379

[22] Filed: Nov. 18, 1988

[51] Int. Cl.[4] .................... G02B 6/10; G02F 1/015
[52] U.S. Cl. .................. 350/96.14; 350/96.13; 350/354
[58] Field of Search .............. 350/96.12, 96.13, 96.14, 350/354, 355, 34; 357/19, 56

[56] References Cited

U.S. PATENT DOCUMENTS

| | | | |
|---|---|---|---|
| 4,166,669 | 9/1979 | Leonberger et al. | 350/96.14 |
| 4,391,486 | 7/1983 | Papuchon et al. | 350/96.14 |
| 4,468,085 | 8/1984 | Papuchon et al. | 350/96.14 |
| 4,521,069 | 6/1985 | Ikeda | 350/96.14 |
| 4,618,210 | 12/1986 | Kondo | 350/96.13 |
| 4,645,293 | 2/1987 | Yoshida et al. | 350/96.14 |
| 4,712,857 | 12/1987 | Lee | 350/96.14 |
| 4,715,680 | 12/1987 | Kawaguchi et al. | 350/96.14 X |
| 4,787,691 | 11/1988 | Lorenzo et al. | 350/96.14 |
| 4,833,511 | 5/1989 | Sugimoto | 350/354 X |

FOREIGN PATENT DOCUMENTS 61-6879  1/1986  Japan ........................... 357/30

Primary Examiner—John D. Lee
Assistant Examiner—John Ngo
Attorney, Agent, or Firm—Robert L. Nathans; Donald J. Singer

[57] ABSTRACT

The present invention provides improved optical switching and modulation through the use of electrically assisted opto-optical devices and optically assisted electro-optical devices. The modulator and switches 34, 60 are guided wave devices comprising silicon channel waveguides on a sapphire substrate. An optically transparent sapphire substrate 12, 42, 62 is used to allow transmission of short wavelength light through the substrate to operate upon the silicon channels in the area of p-n junctions. This permits the construction of dual control electro-optical devices. These guided wave devices operate on light at wavelengths of 1.3 microns or higher.

20 Claims, 3 Drawing Sheets

ELECTRO-OPTIC DEVICES UTILIZING A SAPPHIRE SUBSTRATE

STATEMENT OF GOVERNMENT INTEREST

The invention described herein may be manufactured and used by or for the Government for governmental purposes without the payment of any royalty thereon.

TECHNICAL FIELD

This invention relates generally to integrated optical circuits and the components making up such circuits, and, more particularly, to electro-optical devices having a sapphire substrate upon which is deposited silicon layers. The devices take full advantage of the light guiding properties of silicon and the transparent nature of sapphire to permit manufacture of devices with both electrical and optical controls.

With the recent increased development of lasers and optical fibers, more attention has been directed to integrated optical circuits and the components which make up these circuits. Particular concern has been directed to the area of optical communication systems which operate at a wavelength of 1.3, or 1.55 microns or longer. Since integrated optical components can be coupled efficiently to single mode fibers, such integrated optical components have become essential parts of fiber optic communication networks devoted to telecommunications and other data communication applications. Examples of integrated optical components include solid state optical switches, couplers, and modulators.

As pointed out above, of major concern is the transmission of the electro-magnetic radiation (light) in the 1.3 micron to 1.55 micron wavelength area, the wavelength at which propagation loss through an optical fiber is at a minimum. Optical signal modulators are an essential component for such integrated optical circuits since they are used to generate and control optical signals for transmission. Optical switches are also an essential component since they are used to switch optical signals from one guided wave path to another.

Integrated optical components have become a preferred switching device. These devices have followed several approaches. One approach utilizes the formation of integrated optical components in hetero-structures using formations of gallium arsenide and indium phosphide. Another approach, the one we have preferred, utilizes the formation of integrated optical components in silicon. Examples of these devices can be found in U.S. Pat. No. 4,693,547 to Richard A. Soref and Joseph P. Lorenzo, U.S. Pat. No. 4,728,167 to Richard A. Soref and Joseph P. Lorenzo, U.S. Pat. No. 4,746,183 to Richard A. Soref and U.S. patent application Ser. No. 036,822 to Joseph P. Lorenzo and Richard A. Soref. The devices disclosed in our prior patent application and patents are generally homojunction devices.

The devices we have disclosed in the above-referenced patents utilize an all silicon structure that is far easier and less expensive to manufacture than heterojunction devices. We believe that these devices will form a stepping stone for integrated electro-optical circuits in silicon. In some uses, however, a very high level of mode modulation and switching is desired and other materials must be considered. Unfortunately, inexpensive devices that offer a high level of modulation and switching are not yet readily available.

A need therefore exists for an electro-optic device that is inexpensive and easy to manufacture, yet provides a very high degree of optical modulation and switching.

SUMMARY OF THE INVENTION

The present invention provides improved switching and modulation through the use of electrically assisted opto-optical devices and optically assisted electro-optical devices. The modulators and switches of this invention are guided wave devices comprising silicon channel waveguides on a transparent sapphire substrate. These guided wave devices operate at wavelengths of 1.3 microns or higher.

The preferred embodiment of the invention comprises an electro-optical device having a transparent sapphire substrate with a silicon layer positioned thereon and formed into an optical waveguide. A p-n junction is formed in the silicon waveguide for selectively changing the refractive index of the waveguide. An optical source is used to provide a light beam that is transmitted through the sapphire substrate and into the silicon waveguide in order to also effect changes in the refractive index of the waveguide in conjunction with operation of the p-n junction.

A controlled alteration on the index of refraction of the illuminated region of the silicon waveguide is produced by absorption of short wavelength light. The external light passes through the sapphire substrate and is absorbed largely within the n-type waveguiding region to create therein a high concentration of electron-hole pairs. This occurs because the wavelength of the light is within the intrinsic absorption band of the silicon semiconductor. The light absorption process creates an optical injection of carriers. The resultant refractive index change is due to the free-carrier plasma-dispersion and the dynamic Burnstein-Moss shifts of the energy bands of the solid. The optical injection of carriers adds to the carriers injection electrically induced at the p-n junction.

In one preferred embodiment of the invention, the electro-optical device operates as a mode extinction modulator in which the p-n junction is mounted on single channel waveguide and has ohmic contacts connected to an electrical source. Activation of the p-n junction and shining of light in the junction area results in extinction of optical signals passing through the mode extinction modulator. This system works best when the optical channels are shaped for single mode operation.

In another preferred embodiment of the invention, the electro-optical device comprises a switch in which the silicon layer is formed into crossing optical channel waveguides. A p-n junction is formed at the intersection of the optical channel waveguides and is connected through ohmic contact electrodes to a current source. An optical source is provided for illuminating the junction through the sapphire substrate. The p-n junction and the optical source can both be used to inject carriers that change the index of refraction at the intersection of the channel waveguides, or the light source can be modulated independently to adjust the switch until the guided mode makes a perfect crossover with low crosstalk.

In yet another embodiment of the invention, the channel waveguides are formed having a coupling region where the waveguide channels run parallel and a silicon signal transfer area is formed between the parallel channels. In this case, the crossover state can be achieved with both the control light and the p-n junction switched off, or with the light on and the p-n junction off. The light is used to adjust for a low crosstalk cross state. When both the light and the p-n junction are energized the two controls cooperate to drive the coupler into a low crosstalk bar state.

In all of the above devices both a light source and an electrically controlled p-n junction are used together. Dual control operation allows for fine tuning of the electro-optical devices and either of the inputs can be used to bring the device to threshold so that small changes in the other control input will result in dramatic and rapid operation.

It is therefore an object of this invention to provide guided wave integrated electro-optical devices with dual controls.

It is a further object of this invention to provide an integrated optical switch in which the index of refraction of the waveguide material, which forms the switching capability, is changed by the application of short wavelength light and electrical energy to the channel waveguide.

It is still another object of this invention to provide electro-optical devices which are simple to produce and which can be more readily controlled to provide rapid and complete operation with low crosstalk. A paramount advantage of this invention is that these devices can be fine tuned for threshold operation in order to make them highly sensitive to electrical or optical control pulses.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
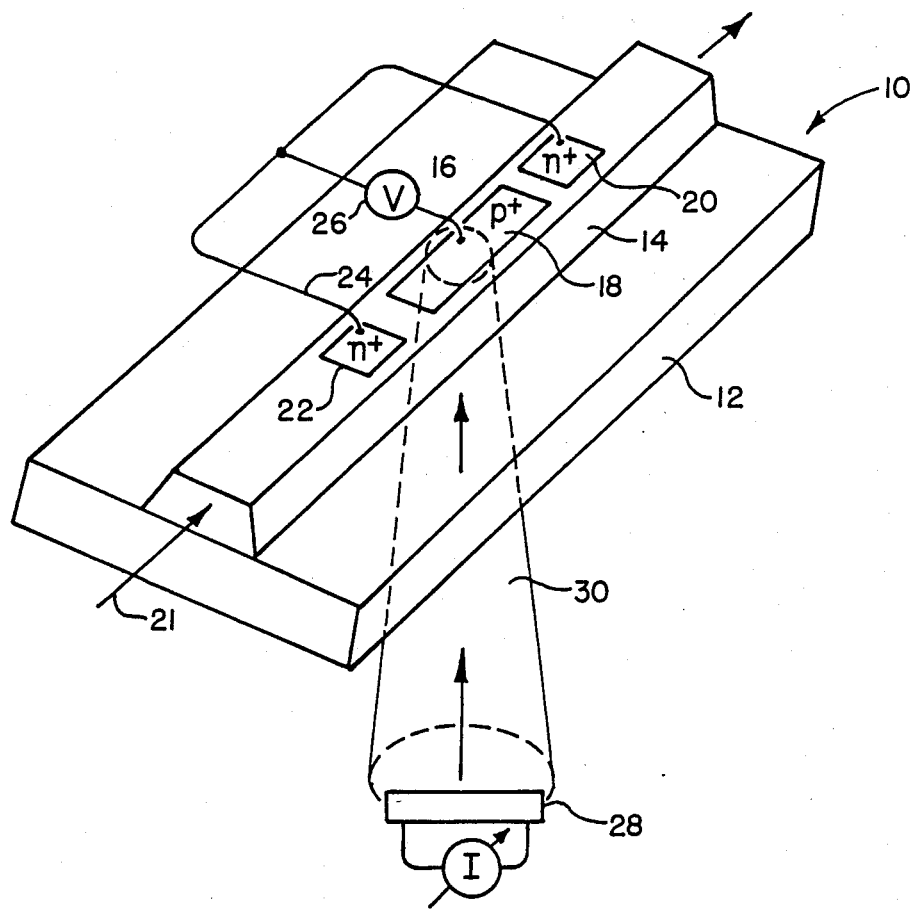
FIG. 1 is a perspective representation of an electro-optic mode extinction modulator embodying the principles of this invention.
Figure 2:
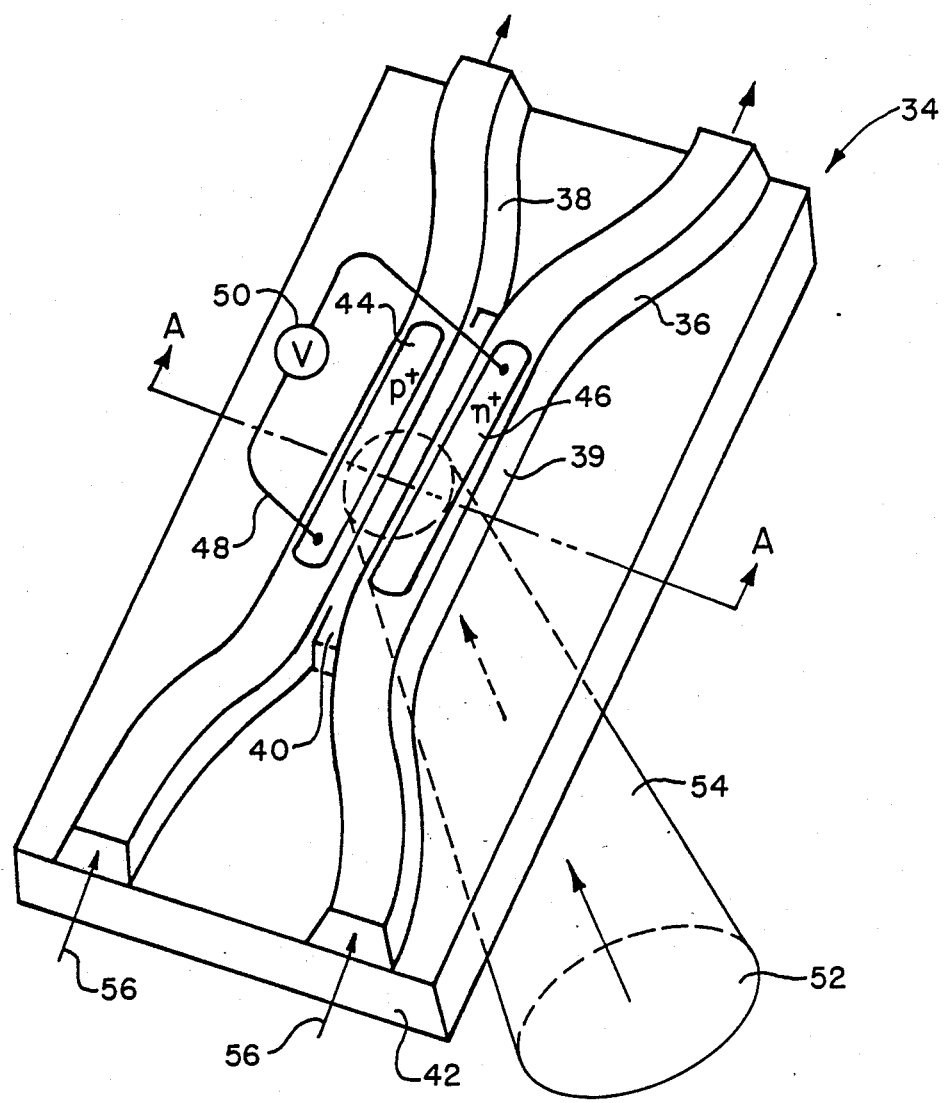
FIG. 2 is a perspective representation of a directional coupler switch which also embodies the principles of this invention.
Figure 3:
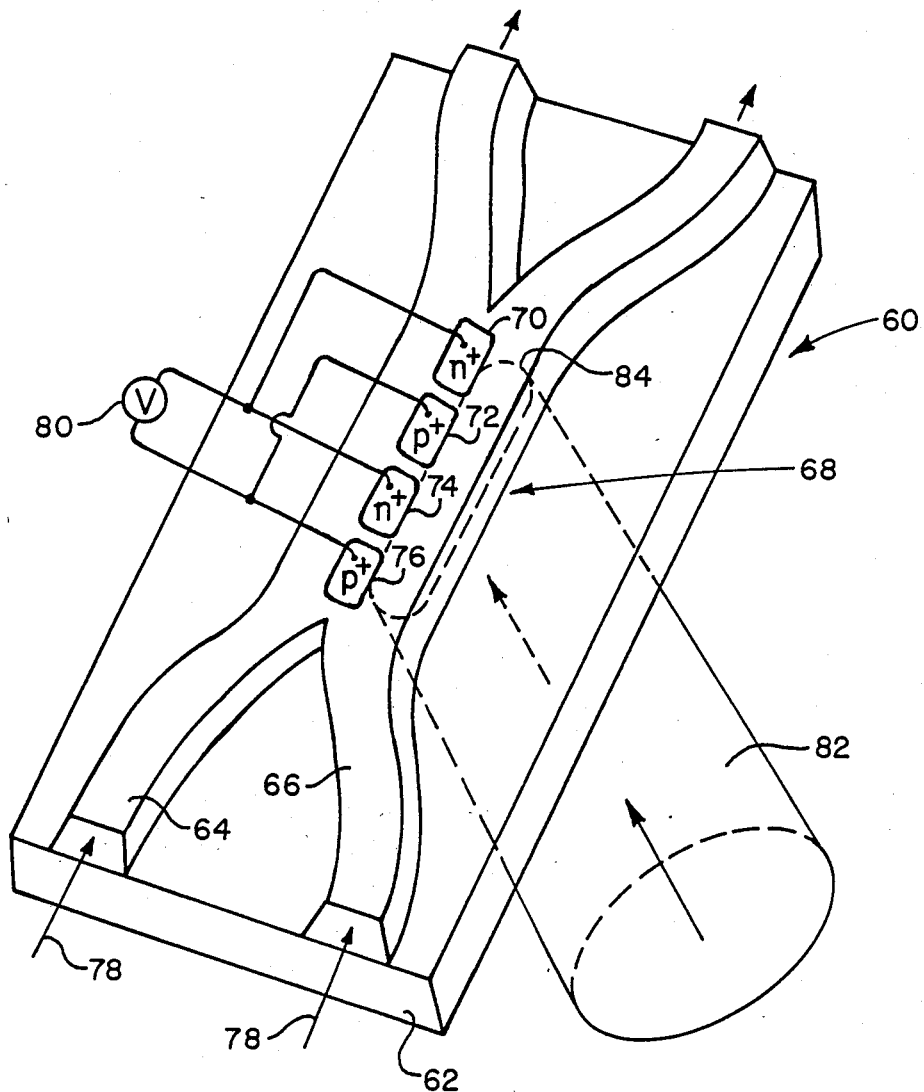
FIG. 3 is a perspective representation of 2×2 switch which also embodies the principles of this invention.

Reference is now made to FIGS. 1-3 of the drawings which show three electro-optic devices which incorporate the principles of this invention. The modulator and switches of this invention are guided wave devices that utilize silicon channel waveguides on a sapphire substrate. The modulator has two optical ports and the optical switches have 4 ports but each may be constructed with additional ports. These optical guided wave devices may be considered electrically assisted optic or optically assisted electro-optic devices. The optical signals transmitted through these devices are preferably at wavelengths of 1.3 to 1.5 microns or longer.

All of the devices of this invention utilize a mono-crystalline silicon film on sapphire to guide the optical signals. The film preferably has a thickness of 1 micron or less, preferably 0.3 microns. The refractive index of the silicon film is typically 3.5 at 1.3 microns. The sapphire substrate which supports the silicon film preferably has a thickness of 300 microns and a refractive index of 1.75 at 1.3 microns. This provides for excellent confinement of optical signals within the silicon waveguides formed in the mono-crystalline silicon layer.

The sapphire substrate is highly transparent throughout the visible and near infrared spectrum. The substrate is optically polished on its bottom surface (for optical access) as well as on the top surface where the crystalline silicon layer is grown.

There are a variety of procedures known in the art for manufacturing high quality silicon on sapphire substrates with minimal dislocations, or twins, and a minimally strained interface region. Although, minor strain and bi-refringence in the silicon film is possible with this structure, growth of good silicon crystal on sapphire is widely known and used in the electronics industry. Cutting of the sapphire crystal along a preferred crystal axis allows the manufacturer to minimize strain at the interface and any resultant optical scattering. Generally, only 0.1 microns or less of badly grown silicon occurs at the interface.

In all of the devices discussed below we have prepared the sapphire with an optically polished bottom surface for optical access. This allows us to project an optical control beam through the substrate and onto the silicon waveguiding film. The optical control beam that is transmitted through the sapphire substrate is preferably of short wavelength, from 0.4 to 0.9 microns (400-900 nm), which is in the fundamental absorption band of silicon. The 0.4 micron light is completely absorbed in a 1 micron depth of silicon and 0.9 micron light is absorbed in a depth of 7 microns of silicon. This incident short wave light transmitted through the bases of the devices creates electron-hole pairs in silicon. If an optical beam of several milliwats of power is focused onto the silicon, it is possible to create (inject) electron-hole pair densities of $10^{17}$ to $10^{18}$ per $cm^3$. This, in turn, produces a refractive index change in the silicon in the range of 0.0003 to 0.003 at the 1.3 micron wavelength. This is called a carrier induced refraction effect.

The structures of this invention use carrier induced refraction to modulate or switch guided light. A forward-biased p-n junction is used to inject carriers into the silicon while a reverse-biased p-n junction is used to deplete carriers (totally) from a sub-micron region of locally doped silicon. The silicon layers must therefore be sub-micron because the depletion layer widths are sub-micron.

When shortwave light is shone on the bottom of a forward-biased junction the light increases the total number of free carriers per $cm^3$ under the junction. Thus light shone through the sapphire substrate results in carrier density enhancement of forward biased p-n junctions. When light is shone on a reverse biased junction, however, a strong electrical field at the junction will tend to sweep out the carriers and reduce the carrier density that would have existed with the light alone. This results in carrier reduction or inhibition, and will also increase the current flow significantly at the biased junction.

In all of these devices, illumination through the substrate is a unique useful feature because it permits opaque, absorbing, or reflecting structures to be situated on the waveguide. These include metal contacts, metal electrodes and heavy doping of n-type and p-type silicon regions.

All of the devices preferably utilize single mode optical waveguides. Since single mode waveguides are as little as 0.3 microns high, special dielectric film coatings may be required on the ends of strips to allow for end fire coupling. Other alternatives include the use of holographic grating couplers on the silicon ribs for in/out coupling.

Referring now to FIG. 1, a mode extinction modulator 10 is shown which utilizes both electrical and optical activation. The modulator comprises a sapphire base 12 upon which has been positioned a silicon waveguide 14 and an elongated the p-n junction 16 on the waveguide.

The waveguide is preferably single mode (e.g., a strip 0.3 microns high by 2 microns wide). The p-n junction comprises a large region of p+ type silicon 18 and two smaller regions of n+ type silicon 20 and 22. These three regions are electrically connected through electrodes and leads 24 to an electrical power source 26. Note that the p+ and n+ regions are embedded in-line on the same single rib waveguide 14. The central part of the junction is typically 10 to 20 microns long. Thus a p+/n/n+ diode has been formed on the undoped (n type) optical waveguide 14. This diode can be either reverse biased to provide a depletion layer or forward biased to provide carrier injection of the optical waveguide 14.

During operation of the mode extinction modulation 10, light is focused from a light emitting diode or laser diode 28 through the sapphire layer and onto the p-n junction area of the waveguide 14. It may also be possible to array the electrical and optical control areas in sequence along the waveguide strips rather than overlapping them physically. The cumulative effect of such a sequence could be the same as an overlap.

A preferred design of the mode extinction modulator utilizes a forward bias on the p-n junction. The electrical injection of carriers can be used to bias the waveguide 14 to the threshold of cutoff of optical signals 21 traveling through the waveguide. Short wave light would then be used to take the mode to extinction. This increases control sensitivity of modulator as compared to mode extinction devices using only optical or electrical control. Similarly, the short wavelength control light can be used as a steady bias for a switched current and the current sensitivity of the modulator can thereby be increased. Use of both electrical and optical control elements makes it possible to tune the mode extinction modulator to a preferred level of sensitivity. This is a significant improvement over conventional modulators with single control inputs, in such conventional modulators sensitivity cannot be readily adjusted.

Figure 2A:
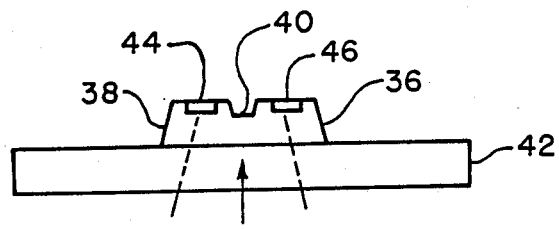
FIG. 2A is a cross section of the directional coupler switch of FIG. 2 taken along line AA.

A directional coupler switch 34 which embodies the principles of this invention is shown in the perspective drawing of FIG. 2 and in the cross section of FIG. 2A. As in the previous embodiment, the channel waveguides 36, 38 are formed on a sapphire substrate 42 as single mode waveguides for optimum switching. The channels 36, 38 run parallel to each other to form an evanescent-wave coupled area 39. A silicon cross coupling area 40 is provided between the two parallel channels. This cross coupling area 40 is etched out slightly to preserve the identity of each guide 36, 38. In an example of this embodiment, the channel waveguide strip is 0.3 microns high and the cross coupling region 40 is 0.2 microns high.

A p-n junction has been formed in the coupling area 39 of the coupler 34. A p+ type region 44 is formed on the top of waveguide 38 and an n+ type region 46 is formed on waveguide 36. These two regions are connected electrically to an electrical power source 50 through electrodes and leads 48, which are shown schematically. The electrodes are preferably ohmic contacts. A light source 52 is also shown schematically for transmitting short wavelength light 54 through the sapphire substrate 42 and into the coupling region.

There are several possible ways to operate the directional coupler 34. When the voltage is off (not applied to the p-n junction), the waveguides are synchronous and $\Delta\beta$ equals zero. Beta ($\beta$), generally, is the speed of the propagated optical signal 56 through the silicon waveguide. If the control beam is then centered on the coupling region, electron-hole pairs are formed and the refractive index of the waveguide midregion is induced to change. This changes the waveguide coupling coefficient K. A secondary effect is to change $\beta$ in both waveguides by the same amount. Thus the short wave control light results in a change in the coupling coefficient $\Delta K$. When the p+/n/n+ diode junction is forward biased, it produces a velocity imbalance $\Delta\beta$ between the guides. Secondarily there is some change in the index of refraction and therefore in the coupling coefficient $\Delta K$. Thus the applied voltage produces a change in $\Delta\beta$ and a changed coupling coefficient $\Delta K$. These controls permit two modes of operation.

A cross state, where a light signal 56 will pass from waveguide 36 to waveguide 38 (or the reverse), is achieved with the light source 52 on and the voltage source 50 off. During this operation, the light level 54 can be adjusted to give a low crosstalk cross state. Adjustment of the light 54 changes the waveguide coupling coefficient without inducing a net difference in $\beta$ between the two waveguides. This permits operation of the coupler with a desired coupling coefficient that produces low crosstalk so that optical signals 56 cross over perfectly from one guide to the other.

The bar state can achieved with both the light 52 and the voltage source 50 turned on. The applied voltage produces a velocity imbalance $\Delta\beta$ between the two guides 36 and 38 as well as some change in the coupling coefficient K. The applied voltage can be varied until the coupler is brought into a low crosstalk bar state. In this state, light traveling through waveguide 36 or 38 will remain in its originating waveguide. One can vary the two controls 50, 52 to achieve the best possible bar state.

It also possible to construct this coupler so that the cross state is given by the light and voltage being switched off. In this case the initial coupling strengths must be chosen by the manufacturing process and the waveguide design, so that optical signals perfectly from one guide to the other when the coupler is inactive. Generally however, the first mentioned cross state is preferred because it gives active control of the device during the cross state and can be easily adjusted for low crosstalk in a variety of operating environments.

With careful manufacturing and use of optical and electrical controls it is possible to achieve nearly perfect low crosstalk bar and cross states. Use of two control inputs allows easy tuning of the coupler to the low crosstalk state.

FIG. 3 shows a 2×2 switch 60 which also embodies the principles of this invention. The switch 60 comprises a sapphire substrate 62 upon which is positioned crossing waveguides 64 and 66. The channel waveguides 64, 66 are preferably single mode except where they join in central area 68. Area 68 can support two optical modes. A pair of p-n junctions are formed by p type and n regions 70, 72, 74 and 76 along the midline of central area. An even larger number of p+-n+ junctions can be formed along the midline if desired. Typically, light signals 78 enter the switch and will either remain in their waveguides 64, 66 or cross depending on operation of the switch which is controlled by an electrical source 80 and an optical source 82. As before, the optical source can comprise a light emitting diode, laser diode, laser diode array or other light source that produces short wavelength infrared light.

The p+-n+ junction is preferably operated as a forward-bias device. During forward-bias operation, the injected carriers are located primarily near the midline of the central section 68 of the channel waveguide. The carriers primarily perturb the symmetric waveguide mode, the anti-symmetric optical mode is relatively unaffected. Light 82 focused into a line shaped region is used in an off-center fashion on the two mode region as shown in FIG. 3 by elongated ellipse 84. The light has the effect of primarily perturbing the anti-symmetric mode.

In accordance with the above, the operation of the switch is as follows; the cross state is achieved with the light (82) on and the voltage (80) off. Here the light intensity is adjusted until the guided mode makes a perfect crossover with low crosstalk. The bar state is achieved with light on and the voltage on. In this case, carriers are added so as to change the interference between the symmetric and anti-symmetric modes over the interaction section 68 until a low crosstalk bar state is achieved.

In all of the above switches, the optical and electrical controls are used to tune the switches for low crosstalk in the bar and cross states in all operating environments. In previous devices it was almost impossible to actively tune switches for low crosstalk using only electrical or only optical controls. In addition, use of both optical and electrical control signals achieves a higher carrier density in the active region of the switch or modulator than would otherwise be possible with either control by itself. Another advantage of this invention, is that use of optical controls produces less heating for the same amount of injected carriers than comparable electrical controls. It is also believed that in the case of the mode extinction modulator more complete optical signal extinction can be achieved than with any previous single control design. All of these designs rely on the optical transparency of the sapphire substrate to permit use of dual controls.

Yet another advantage of these devices lies in their structure. Use of transparent sapphire permit the placement of opaque structure on the surface of the devices yet allows optical control from below the silicon waveguide.

While the invention has been described with references to the preferred embodiments thereof it will be understood by those skilled in the art that there are various changes in substance and form that can be made without departing from the spirit and scope of the invention as described in the appended claim.

I claim:

1. An electro-optical device comprising:
   a transparent sapphire substrate;
   a silicon layer positioned on said substrate and formed into an optical waveguide;
   a p-n junction formed in said silicon waveguide for selectively changing the refractive index of said waveguide;
   a current source for supplying activating energy to said p-n junction; and
   an optical source positioned for providing a beam of light that is transmitted through said sapphire substrate and into said silicon waveguide in order to change the refractive index of the waveguide.

2. The electro-optical device of claim 1 wherein the beam of light is of a wavelength in the range of 400 nm to 900 nm.

3. The electro-optical device of claim 1 wherein the optical beam is focused on the p-n junction.

4. The electro-optical device of claim 1 wherein said optical waveguide comprises two optical waveguide channels having a coupling region comprising both optical waveguide channels and a silicon transfer area therebetween to allow the passage of optical signals between said channels.

5. The electro-optical device of claim 4 wherein said p-n junction is formed adjacent to said transfer area.

6. The electro-optical device of claim 4 wherein said optical channels are shaped for single mode operation.

7. The electro-optical device of claim 1 wherein the device preferably operates as a mode extinction modulator through the use of both the p-n junction and short wavelength light from said optical source.

8. The electro-optical device of claim 7 wherein said beam of light is focused on said silicon layer adjacent to said p-n junction.

9. The electro-optical device of claim 1 wherein said p-n junction further comprises ohmic contact electrodes mounted to said optical waveguide for transferring electrical energy from said current source to p type and n type silicon formed on said waveguide.

10. An electro-optical coupler comprising:
    a transparent sapphire substrate;
    a silicon layer positioned on said substrate and formed into two optical channel waveguides having a coupling region comprising parallel optical channels and a silicon signal transfer area there between;
    a p-n junction formed in said silicon channel waveguides for selectively changing the refractive index of said waveguides;
    a current source for supplying activating energy to said p-n junction; and
    an optical source positioned for providing a beam of light that is transmitted through said sapphire substrate and into said silicon waveguides in order to change the coupling coefficient of said channel waveguides to selectively allow the passage of optical signals between said channel waveguides.

11. The electro-optical device of claim 10 wherein the beam of light is of a wavelength in the range of 400 nm to 900 nm.

12. The electro-optical device of claim 10 wherein the optical beam is focused on the p-n junction.

13. The electro-optical device of claim 10 wherein said p-n junction is formed adjacent to said coupling region of said optical waveguides.

14. The electro-optical device of claim 10 wherein said optical channel waveguides are shaped for single mode operation except at said coupling region.

15. An electro-optical switch comprising:

a transparent sapphire substrate;

a silicon layer positioned on said substrate and formed into crossing optical channel waveguides wherein said optical channel waveguides merge and then separate;

a p-n junction formed at the merger of said optical channel waveguides for selectively changing the refractive index of the silicon layer at the junction of said optical waveguides;

a current source for supplying activating energy to said p-n junction; and an optical source positioned for providing a beam of light that is transmitted through said sapphire substrate and into said silicon optical waveguides in order to selectively change the refractive index of the waveguides.

16. The electro-optical device of claim 16 wherein the beam of light is of a wavelength in the range of 400 nm to 900 nm.

17. The electro-optical device of claim 16 wherein the optical beam is focused on the merger of said optical channel waveguide in an off-center manner.

18. The electro-optical device of claim 16 wherein said p-n junction is formed adjacent to said junction of said optical waveguides.

19. The electro-optical device of claim 16 wherein said optical channel waveguides are shaped for single mode operation except at the merger region of said optical channel waveguides.

20. The electro-optical device of claim 16 wherein said p-n junction further comprises ohmic contact electrodes mounted to said optical channel waveguides for transferring electrical energy from said current source to p type and n type silicon areas formed in said channel waveguides.

* * * * *